United States Patent

[11] 3,633,946

[72] Inventor John Kazmierski, Jr.
       Ringoes, N.J.
[21] Appl. No. 15,493
[22] Filed Mar. 2, 1970
[45] Patented Jan. 11, 1972
[73] Assignee Johns-Manville Corporation
       New York, N.Y.

[54] FLUID FLOW DEFLECTING BAFFLE FOR EXPANSION JOINTS IN FLUID CONDUITS
7 Claims, 1 Drawing Fig.

[52] U.S. Cl.................................................. 285/229, 138/44, 285/300
[51] Int. Cl............................................... F16l 27/10, F16l 51/02
[50] Field of Search........................................... 285/229, 226, 227, 228, 300, 301, 299, 235, 236; 138/44, 26, 30

[56] References Cited
UNITED STATES PATENTS

| | | | |
|---|---|---|---|
| 2,337,038 | 12/1943 | Fentress | 285/300 X |
| 3,459,444 | 8/1969 | Rofe | 285/226 |
| 3,460,856 | 8/1969 | Van Tine et al. | 285/300 X |
| 3,241,868 | 3/1966 | Soderberg | 285/300 X |
| 1,420,217 | 6/1922 | Richards | 138/44 |
| 2,631,774 | 3/1953 | Plummer | 138/44 |
| 1,802,766 | 4/1931 | Kerr | 138/44 |

FOREIGN PATENTS

| | | | |
|---|---|---|---|
| 1,172,455 | 10/1958 | France | 285/300 |
| 908,025 | 10/1962 | Great Britain | 285/229 |
| 658,505 | 10/1951 | Great Britain | 285/226 |
| 805,834 | 5/1951 | Germany | 285/226 |

*Primary Examiner*—Thomas F. Callaghan
*Attorneys*—John A. McKinney and Robert M. Krone ABSTRACT: A fluid flow deflecting and turbulence reducing baffle to circumferentially bridge the interior flow channel through expansion joints in fluid transmitting conduits, comprising in combination with a conduit expansion joint having an intermediate movable section, a circumferential baffle member which is fixed to and in contact with the interior of the upstream terminal end of the expansion joint and thereby supported in cantilever fashion, and extends therefrom to the approximate location of the opposite downstream terminal end of the expansion joint thereby bridging the joint, said circumferential baffle member being shaped, beginning from the position fixed to the terminal end of the expansion joint at its upstream location, with an initial section converging inwardly into the conduit flow path and towards the other terminal end downstream at an acute angle in relation to the approximate conduit flow path and axis, a following intermediate section extending approximately parallel to the conduit flow path and axis, and a final section diverging outwardly away from the conduit flow path and axis in a direction towards the downstream terminal end of the expansion joint, providing a venturi-type configuration.

PATENTED JAN 11 1972
3,633,946
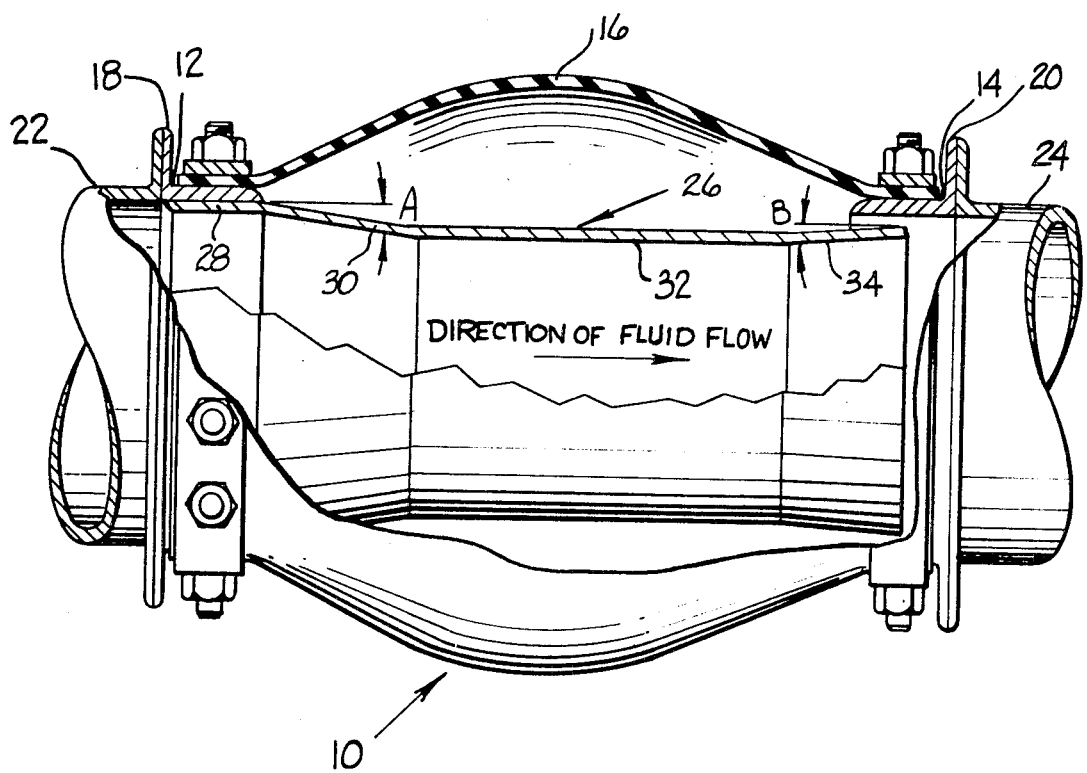
INVENTOR.
JOHN KAZMIERSKI JR.
BY John A. McKinney
ATTORNEY

FLUID FLOW DEFLECTING BAFFLE FOR EXPANSION JOINTS IN FLUID CONDUITS

BACKGROUND OF THE INVENTION

This invention is concerned with flexible or sliding and the like moveable-type expansion joints for use in fluid transmitting conduits carrying fluid materials and high or low temperatures wherein the conduit must be provided with means for limited freedom of movement in response to temperature induced expansion and contraction. Typical of the expansion joints to which this invention relates is the type shown in U.S. Letters Pat. No. 3,460,856 to Van Tine et al., which patent disclosure is incorporated herein by reference. Common expansion joints for conduits carrying fluids at immoderately high or low temperature comprise constructions including irregular or varying components such as pliable or flexible materials which present corrugated or billowed surfaces that tend to disrupt fluid flow patterns, and because of their need to yield and flex they are often composed of compositions such as textiles or elastomers which suffer from attrition due to fluid impingement. To reduce turbulence in the fluid flow patterns past expansion joints and to shield the vulnerable portion(s) or material(s) from erosion, common expansion joints frequently include a fluid guiding baffle such as the internal sleeve shown in U.S. Pat. No. 3,460,856.

SUMMARY OF THE INVENTION

This invention comprises an improved fluid flow deflecting baffle which more effectively dampens turbulence and fluid eddies, augments smooth laminar flow, and also reduces heat loss from the fluid across the approximate area of the expansion joint. The baffle construction of this invention constitutes a circumferential fluid foil design of a converging restriction and diverging expansion with an intermediate section of essentially unchanging or static cross-sectional area, which construction significantly increases smooth laminar flow of the fluid material at its trailing edge hereby reducing turbulence and heat loss from thermal convection attributable to turbulence.

It is the primary objective of this invention to provide a fluid flow deflecting baffle for common fluid conduit expansion joints which improves laminar flow of the fluid material through and past the joint, and reduces heat loss from the fluid.

BRIEF DESCRIPTION OF THE DRAWING

The figure of the drawing is a side elevational view, with portions thereof broken away, of a pair of opposing end sections of a fluid conduit which is joined together with an intermediate expansion joint of common construction, having the improved fluid flow deflecting baffle of this invention illustrated therein.

DESCRIPTION OF THE PREFERRED EMBODIMENT

As indicated hereinbefore, this invention is concerned with an improvement in common expansion joints for conduits carrying fluids at immoderate temperatures, and in particular such joints which are constructed with a composite flexible intermediate section such as described in the aforementioned U.S. Letters Pat. No. 3,460,856. Referring to a typical expansion joint such as disclosed in the said patent and in the herewith drawing, an expansion joint unit generally illustrated as 10 is constructed of a pair of spaced-apart terminal members 12 and 14 which are separated by and carrying secured thereto the ends of an intermediate flexible material 16 of the expansion joint. Flexible material 16 may be composed of asbestos felts, high-temperature silicone rubber or other elastomers, metal mesh, etc., or combinations thereof, as commonly employed in the prior art. The terminal members 12 and 14 are preferably flanged at 18 and 20 respectively to facilitate securing them, and in turn the expansion joint unit, by means of welds, bolts, or other common expedients to the adjacent abutting ends of pipe sections of the fluid transmitting conduit shown as 22 and 24, thereby providing an uninterrupted fluid passageway running therethrough.

Thus connected, the flexible intermediate material 16 of the expansion joint unit 10 permits limited freedom of longitudinal and lateral movement between the sections of pipe 22 and 24 terminating in contact with the expansion joint unit 10, and forms a transmitting channel in communication with the sections 22 and 24 of the conduit.

To facilitate fluid flow past the expansion joint unit 10, and especially the body of intermediate flexible material 16 which may be compressed to a pronounced corrugated or billowed condition upon expansion of the conduit sections due to the heat of the fluid carried, a deflecting baffle may be employed as shown in U.S. Letters Pat. No. 3,460,856. This invention essentially constitutes an improved fluid deflecting baffle member and construction therefor shown generally as 26, constructed as hereinafter described.

The fluid flow deflecting baffle 26 of this invention is generally circumferential in configuration, essentially surrounding and generally following the internal cross-sectional contour of the interior of the expansion joint unit 10, which may be round, elliptical, square or of other angular shape, but most typically is round or rectangular. Moreover, the baffle 26 essentially extends approximately from one terminal member of the unit 12 to the other terminal member 14, thereby approximately bridging the body of intermediate flexible material 16.

The circumferential baffle member 26 is fixed, as by welding or other suitable means, to and in contact with the terminal member 12 of the unit 10 which is to be located in the upstream position and is supported therefrom in cantilever fashion as shown at 28. The baffle member 26, following the portion 28 secured in fixed contact to terminal member 12, and proceeding towards the other terminal member 14, is designed and shaped in three distinct circumferential sections. The first of said sections 30 converges inwardly from the portion 28 which is fixed to the upstream terminal member 12, into the conduit flow path in a direction towards the approximate axis of the fluid transmitting conduit and the flow therethrough. The inwardly inclined first section 30 converges towards the approximate axis at an angle acute in relation to the conduit, as shown by angle A in the drawing, and preferably at an angle of less than approximately 25°, with a range of about 3° to 15° being most expedient. The following second or intermediate section 32 of the baffle 26 is directed approximately parallel to the axis of the conduit and fluid flow therethrough, providing an area of unchanging or static cross-sectional dimension. The third and terminating section 34 diverges outwardly away from the approximate axis of the conduit and fluid flow therethrough, and terminates at a downstream location at least approximately to that of the downstream terminal member 14. The third and final section 34 is inclined outwardly in relation to the approximate axis of the conduit, and approaches the conduit at an angle, as shown by angle B in the drawing, preferably less than the angle of the direction of the first such sections converging inwardly, for example less than approximately 20°, and optimumly between about 2° and 10°.

The described circumferential fluid flow deflecting baffle consisting of the construction of an inwardly directed converging section 30, intermediate static or essentially unchanging section 32, and an outwardly directed diverging section 34, which in total at least approximately spans the area of the expansion joint, reduces turbulence and encourages smooth laminar flow while minimizing heat loss attributable to convection of thermal energy resulting from current eddies as the fluid in transmission passes through the expansion joint located within the conduit system.

I claim:

1. In an expansion joint unit for conduits transmitting fluid at immoderate temperatures to accommodate movement therein attributable to expansion and contraction; said expansion joint unit having a pair of spaced apart rigid terminal members for securing the expansion joint unit in fluid conducting relationship with opposable section ends in a fluid transmitting conduit; and said spaced-apart rigid terminal members having been connected in fluid transmitting relationship to each other through an intermediate flexible material which thereby provides a fluid channel expansion joint and permits movement in the terminal members independent of each other and thus accommodating movement in the fluid transmitting conduit sections respectively secured thereto: the improvement comprising a fluid flow deflecting baffle circumferentially surrounding the interior area of the expansion joint unit and fixed in contact to one of the said rigid terminal members which is to be located in the upstream position in fluid transmission therethrough and supported from said fixed contact in cantilever fashion; said circumferential fluid flow deflecting baffle being provided in at least three directional deflecting sections in approximate relation to the conduit in the direction of the fluid transmitting flow therethrough, the first of said sections of the circumferential baffle beginning adjacent to the portion of the baffle fixed in contact and supported by the one terminal member and converging in a direction inwardly towards the approximate axis of the conduit at an angle acute to the said conduit, the second of the said sections of the circumferential baffle directed in approximate parallel relationship to the conduit, and the third of said sections directed diverging outwardly toward the conduit and terminating at least approximately adjacent to the other rigid terminal member which is opposite the said member fixed in contact to and supporting the said circumferential baffle.

2. The expansion joint unit for conduits transmitting fluid at immoderate temperatures of claim 1 with the improved circumferential fluid deflecting baffle, wherein the said third of the sections of the circumferential fluid deflecting baffle is directed diverging outwardly toward the conduit and approaches the conduit at an acute angle in relation to the said conduit which is smaller than the acute angle of the direction of the first of the said sections in relation to the conduit in converging inwardly towards the approximate axis of the conduit.

3. The expansion joint unit for conduits transmitting fluid at immoderate temperatures of claim 1 with the improved circumferential fluid deflecting baffle, wherein the said first of the sections of the circumferential fluid deflecting baffle is directed converging inwardly towards the approximate axis of conduit at an acute angle to the said conduit of less than approximately 25°.

4. The expansion joint unit for conduits transmitting fluid at immoderate temperatures of claim 3 with the improved circumferential fluid deflecting baffle, wherein the said first of the sections of the circumferential fluid deflecting baffle is directed converging inwardly towards the approximate axis of the conduit at an acute angle to the said conduit of within the range of approximately 3° to 15°.

5. The expansion joint unit for conduits transmitting fluid at immoderate temperatures of claim 3 with the improved circumferential fluid deflecting baffle, wherein the said last of the sections of the circumferential fluid deflecting baffle is directed diverging outwardly toward the conduit at an acute angle to the said conduit of less than approximately 20°.

6. The expansion joint unit for conduits transmitting fluid at immoderate temperatures of claim 5 with the improved circumferential fluid deflecting baffle, wherein the said last of the sections of the circumferential fluid deflecting baffle is directed diverging outwardly toward the conduit at an acute angle to the said conduit in the range of approximately 2° to 10°.

7. The expansion joint unit for conduits transmitting fluid at immoderate temperatures of claim 1 with the improved circumferential fluid deflecting baffle, wherein the said circumferential fluid deflecting baffle is constructed comprising a first inwardly converging section, second static intermediate section, and a third outwardly diverging section.

* * * * *